Dec. 20, 1955  J. D. MacKNIGHT  2,727,778
DEVICE FOR RECOVERING OBJECTS FROM WELL BORES
Filed Dec. 29, 1950
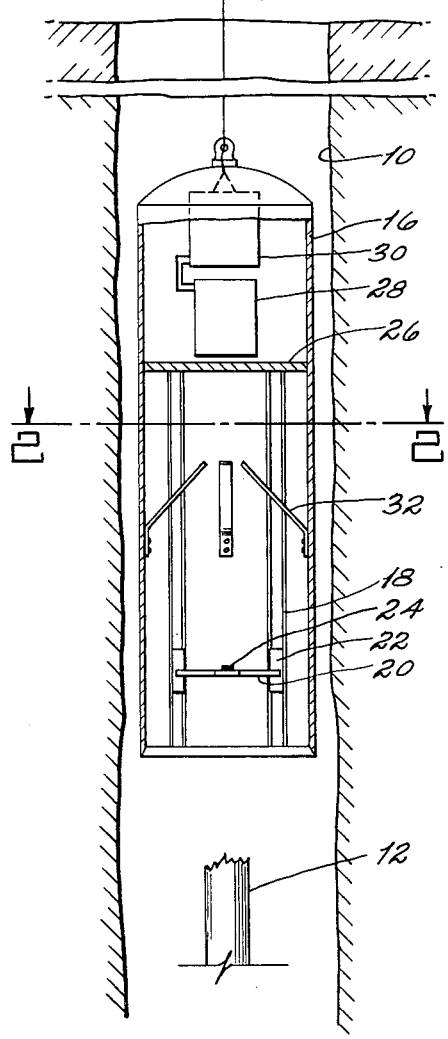
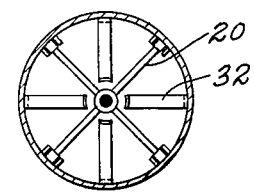
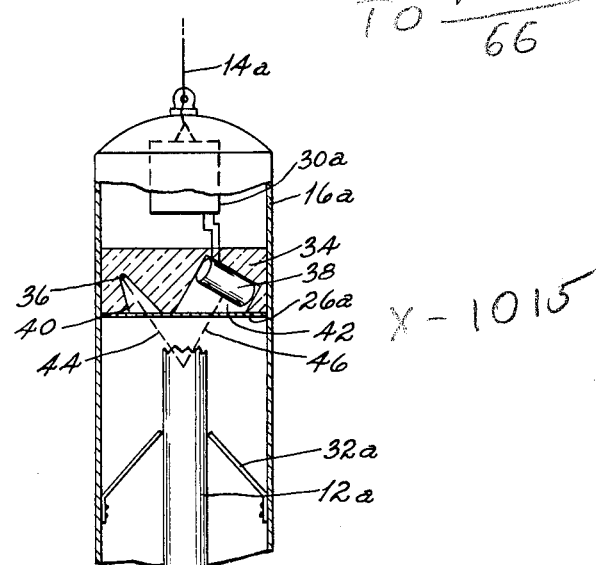
INVENTOR.
JOHN D. MACKNIGHT
BY
ATTORNEYS

United States Patent Office 2,727,778
Patented Dec. 20, 1955

2,727,778

DEVICE FOR RECOVERING OBJECTS FROM WELL BORES

John D. MacKnight, Mount Vernon, N. Y., assignor to The Texas Company, New York, N. Y., a corporation of Delaware Application December 29, 1950, Serial No. 203,521

2 Claims. (Cl. 294—86)

This invention relates to an apparatus for recovering objects such as broken tools, pipe and the like, from bore holes or wells, and more particularly to an apparatus by means of which an indication will be provided at the surface when the object to be retrieved has been securely grasped so that it can be withdrawn upwardly. The principal object of the invention is the provision of a recovery apparatus or a "fishing tool" as such devices are sometimes known, which is reasonably simple in construction and which contains means for providing a positive indication at the surface that the tool is about to engage the object, that it has subsequently firmly grasped the object and also that the tool is maintaining its grasp on the object during the upward travel through the hole.

In the U. S. Letters Patent No. 2,347,759, granted May 2, 1944, to Thomas C. Wherry, a fishing tool is disclosed in which a detector of penetrative radiation is mounted within the tool. In accordance with the Wherry disclosure, the object to be retrieved must first be provided with a source of radioactive material and the arrangement is such that when the cylinder passes downwardly over the object, radiation from the source on the object will strike the detector to provide an indication at the surface. The great disadvantage of this system is, of course, the fact that the object to be fished or retrieved must be provided with a source of radiation and it will be apparent that in many cases this will not be possible. For example, if the drill string should break, there would be no reason to assume that a source of radiation had been previously placed in or on that portion of the drill pipe just below the point where the break occurred.

In accordance with the present invention it is not necessary that any source of radiation be affixed to the object to be retrieved or, in fact, that the object be treated in advance in any unusual way whatsoever. In carrying out the invention the retrieving device or tool in the shape of an open-bottomed cylinder is provided near its lower portion with a source of penetrative radiation such as gamma rays, neutrons or the like, the source being mounted so as to be slidable vertically within the cylinder. In the upper portion of the cylinder a detector of the radiation being used is disposed in substantial vertical alignment with the source. The output of the detector is preferably preamplified within the tool housing and the amplified output conducted upwardly through the suspended cable to the surface where it is again amplified and recorded or passed to some suitable indicating device. Within the tool housing or cylinder intermediate the lowest position of the source and the detector are means for grasping and holding the object, once the cylinder has passed downwardly over the object to a predetermined distance. When the bottom of the cylinder reaches the upper end of the broken tool or drill pipe, the source of radiation is engaged by the object and pushed relatively upwardly in the cylinder as the cylinder continues to be lowered over the object. As the source moves upwardly toward the detector, the radiation strikes the latter and the output of the detector increases until the tool has been lowered sufficiently far for the object to be grasped and held securely within the tool. The source will of course remain in its upward position as long as it is held there by the object during the upward pulling of the tool and an operator at the surface will thereby be kept informed that the object is still being held by the tool. In a modification the source and detector are fixed in the upper portion of the sleeve and arranged so that when the object being retrieved is in the cylinder in the proper position to be withdrawn some of the radiation will be scattered in the object and back to the detector. This increase in the detector output will notify the operator that the withdrawal operation can be made.

For a better understanding of the invention, reference may be had to the accompanying drawing in which—

Figure 1 is a vertical sectional elevation through a portion of a well bore showing the fishing tool suspended just above an object to be retrieved;

Figure 2 is a cross section on the line 2—2 of Figure 1 looking in the direction of the arrows, and Figure 3 is a vertical sectional elevation through a portion of a fishing tool showing a modification.

Referring to Figures 1 and 2 of the drawing, a well bore 10 is shown as containing an object 12 which may be a piece of drill pipe, a portion of tubing or pump rod or substantially any other object which has been previously placed in the bore. Suspended by means of a cable 14 within the bore 10 is a fishing tool housing or cylinder 16 having an open bottom and adapted to be lowered over at least part of the object to be retrieved. Around the interior of the cylinder 16 a plurality, four in this instance, of vertical guides or tracks 18 are disposed, these tracks serving as guides to permit vertical sliding movement of a spider 20. The outer ends of the spider arms are preferably provided with short vertically disposed runners 22 adapted to slide upwardly and downwardly in the tracks 18. The center portion of the spider has secured thereto a small amount of a radioactive material 24, such as radium or a material containing radium, for example, Carnotite. In the upper portion of the cylinder 16 a horizontal partition 26 is provided and in the space above this partition is a radiation detector 28, the output of which is connected to a suitable preamplifier 30 whose output in turn is connected to the lower end of cable 14. The upper end of the cable 14 passes over a suitable cable measuring reel 31 and then to an amplifier 31a, the output of which passes to a suitable recording or indicating device 31b. Assuming that a source 24 of gamma rays is used, then the detector 28 can be an electrical pulse-producing device such as the conventional Geiger-Mueller counter, or it can be of any other suitable type such as an ionization chamber. If a source of neutrons, rather than gamma rays, is used, the detector 28 will, of course, be a detector of neutrons.

Within the cylinder 16 and below the partition 26 is a device for grasping and holding the object 12 so that it can be withdrawn when the cylinder is raised. In the example shown, this grasping device 32 comprises a plurality of fairly stiff spring members or fingers secured at their lower ends to the inner surface of the cylinder and projecting upwardly and inwardly. As shown in Figure 2, four of the spring members are illustrated, these being alternated with the arms of the spider 20, so that as the spider slides vertically, it will not touch the spring arms. Obviously, additional spring members may be used, as well as additional arms on the spider 20, it being necessary merely to space the elements so that the spider can move freely in a vertical direction within the cylinder 16 without touching the fingers 32. If desired, the upper ends of the fingers may be sharpened or slightly concaved so that they will be better able to grip the object to be retrieved.

In Figure 3 a modification of the invention is illustrated. In this embodiment the partition 26a corresponds to the partition 26 in Figure 1, but is preferably thinner than that previously described. Directly above the partition 26a is a block or mass 34 of material such as lead, capable of absorbing gamma rays. Within the block 34 and near to one side thereof is a small source or capsule 36 containing penetrative radiation such as radium and within the block and near the other side thereof is a small gamma ray detector 38, the output of which is led to a preamplifier 30a connected in turn to the cable 14a. The block 34 is preferably provided with slots or openings 40 and 42 projecting downwardly and inwardly from the source 36 and the detector 38, respectively. The cylindrical housing 16a is also provided with spring members or fingers 32a corresponding to the members 32 of Figure 1, these members being designed to grasp the object 12a when the housing 16a has been lowered thereover.

In the operation of the embodiment illustrated in Figure 3, the housing or cylinder 16a is lowered over the object 12a as has been described with reference to the form shown in Figures 1 and 2, until the fingers 32a have passed downwardly over the object far enough to grasp the object as is shown in Figure 3. Prior to the time the tool has been lowered over the object 12a, gamma rays from the source 36 will pass downwardly through the slot 40 and a few of these gamma rays may be scattered in the fluid within the housing 16a and back to the detector 38 through the slot 42. The gamma rays from the source tending to pass directly toward the detector 38 will be absorbed in the shielding material 34 so that they will not strike the detector to cause spurious counts or pulses. When the housing 16a is lowered far enough so that the object 12a passes up into the housing above the fingers 32a, gamma rays such as the one indicated at 44 will penetrate the object and some will be scattered therein to return to strike the detector 38 along the path 46, for example. Since the object 12a will have a considerably greater density than the fluid within the housing 16a, a considerably greater number of gamma rays will be scattered and returned to the detector 38, when the object 12a is in a position such as is shown in Figure 3. This increase in the counting rate or output of the detector 38 will be noted at the surface as has been described with reference to Figure 1 and the operator will know that the tool housing has grasped the object to be retrieved. While the tool is being pulled upwardly through the hole, the output of the detector 38 should remain at this higher value, thus indicating to the operator that the object is still being held by the tool. If, however, the output of the detector 38 should decrease, the operator will know that the object 12a is slipping downwardly or has actually slipped out of engagement with the fingers 32a and he will again lower the tool in an endeavor to obtain a new hold on the object.

It will be observed that with the two embodiments of the invention which have been disclosed, there are no electrical contacts to be opened or closed within the fishing tool with the attendant possibility of the contacts being fouled or stuck, nor is it necessary to have a source of radiation attached to the object to be retrieved. The indication or signal to the operator that the tool is in the proper position and that the object is being held by the tool in its upward passage is entirely automatic and substantially trouble free.

It is to be understood that the particular gripping device 32 or 32a which has been described is by way of example only. It is contemplated that any other suitable means can be provided for engaging and holding the object being retrieved. The device illustrated is sometimes known as a "junk basket."

While gamma rays have been described as the type of radiation it is also to be understood that any form of radiation may be used providing the rays or particles are capable of traveling at least several inches. Neutrons can be used in both embodiments shown providing the detectors are responsive to neutrons. In the embodiment of Figure 1 the source might conceivably be a source of visible light in which case the detector would be a suitable photoelectric cell.

Obviously many modifications and variations of the invention as hereinbefore set forth may be made without departing from the spirit and scope thereof, but only such limitations should be imposed as are indicated in the appended claims.

I claim:

1. A fishing tool for retrieving an object from a bore hole comprising a sleeve member adapted to be lowered over said object while said sleeve member is suspended from a cable, vertically disposed guides secured to the inner surface of said sleeve, means slidably mounted for vertical movement in said guides and adapted to be engaged by said object and moved relatively upwardly in said sleeve as the sleeve passes downwardly over the object, a source of radiation affixed to said slidable means, a radiation responsive detector disposed in the upper portion of said sleeve, means for indicating at the surface the response of said detector, and means within the sleeve for grasping and retaining said object.

2. A fishing tool for retrieving an object from a bore hole comprising a sleeve member adapted to be lowered over said object while said sleeve member is suspended from a cable, means slidably mounted for vertical movement within said sleeve and adapted to be engaged by said object and moved relatively upwardly in said sleeve as the sleeve passes downwardly over the object, means for indicating at the surface the vertical movement and position of said slidable means within said sleeve comprising a source of radiation affixed to said slidable means and a radiation responsive detector disposed in the upper portion of the sleeve and in alignment with said source, means for indicating the response of said detector and means within the sleeve for grasping and retaining said object.

References Cited in the file of this patent

UNITED STATES PATENTS

| Re. 22,531 | Hare | Aug. 22, 1944 |
| 2,154,654 | Armentrout et al. | Apr. 18, 1939 |
| 2,315,819 | Schlesman | Apr. 6, 1943 |
| 2,347,759 | Wherry | May 2, 1944 |
| 2,399,061 | Rosemblumm | Apr. 23, 1946 |
| 2,554,715 | Mellett | May 29, 1951 |

OTHER REFERENCES

"Determination of Mercury level in a steel-tube manometer," by R. Meakin, Journal of Scientific Instruments; December 1951, vol. 28, pp. 372–373. (Copy on file in 73/398 in Div. 36 of Patent Office.)